United States Patent

[15] 3,646,867

Ono

[45] Mar. 7, 1972

[54] FILM WINDUP DEVICE FOR CAMERAS PROVIDED WITH A FOCAL PLANE SHUTTER

[72] Inventor: Shigeo Ono, Yokohama-shi, Japan

[73] Assignee: Nippon Kogaku K.K., Tokyo, Japan

[22] Filed: Oct. 14, 1969

[21] Appl. No.: 866,280

[30] Foreign Application Priority Data

Oct. 18, 1968 Japan..................................43/75625

[52] U.S. Cl. .........................95/31 AC, 95/31 FM, 95/31 FS
[51] Int. Cl......................................G03b 17/36, G03b 19/04
[58] Field of Search..........................95/31 AC, 31 FM, 31 FS

[56] References Cited

UNITED STATES PATENTS 2,930,303   3/1960   Sago....................................95/31 AC

*Primary Examiner*—Samuel S. Matthews
*Assistant Examiner*—Michael L. Gellner
*Attorney*—Ward, McElhannon, Brooks & Fitzpatrick

[57] ABSTRACT

A windup device for cameras having film-advancing means, a shutter, a clutch for normally connecting the film-advancing means to the shutter in operative engagement, a film counter and a back cover, the device being characterized by a mechanism for returning the film counter to its initial position while simultaneously disengaging the clutch upon opening the back cover and a mechanism for retaining the clutch in its disengaged position for a predetermined film advance subsequent to closure of the back cover.

7 Claims, 1 Drawing Figure

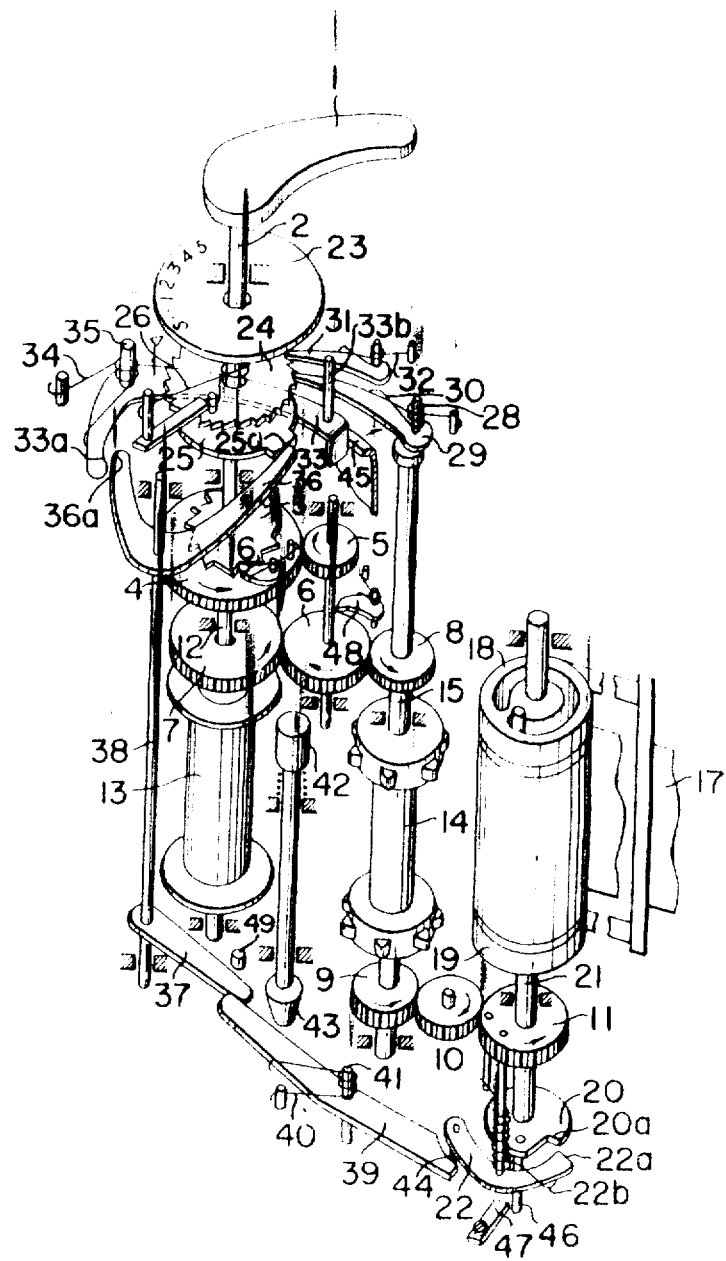

FILM WINDUP DEVICE FOR CAMERAS PROVIDED WITH A FOCAL PLANE SHUTTER

This invention relates to a film windup device for cameras provided with a focal plane shutter and a film frame counter, which is advanced by one scale interlocking with a film-feeding means and restored to the starting position by opening the back cover of the camera.

In cameras in which the roll of film is taken up by the spool, it is necessary to first draw out film, fix it to the spool, close the back cover, and then feed two or three frames of film in order to bring the unexposed portion of the film to the film window. For this purpose, idle shots must be made with conventional cameras.

An object of this invention is to offer means which eliminates the aforementioned wasteful operation at the time of film loading by first feeding only the film without setting the shutter when the windup lever is operated and by setting the shutter and making the camera ready for shooting when a predetermined length of film has been fed.

Another object of this invention is to offer means which is capable of performing the aforementioned operation, but with a simple construction, in order to assure the operation.

According to this invention, a film windup means for cameras of the above-mentioned type comprizes a clutch means for connecting or disconnecting a shutter tensing gear train to or from the shutter, a control member acting on the said clutch to control the connection or disconnection between said gear train and shutter, a control cam combined with a scale plate of said frame counter, and a return lever operating in conjunction with the opening and closing operation of the back cover. These elements are so arranged that said return lever operates said control member in conjunction with the back cover opening operation to disengage said clutch and said control cam holds said clutch in a disengaged state by way of the control member during the period wherein a fixed amount of film is advanced after the closure of the back cover.

This invention will be described in more detail with reference to an embodiment, shown in the attached drawing.

In the drawing: 1 is a windup lever; 2 is a windup lever shaft; and 3 is a ratchet. These elements form one unit and are energized to rotate clockwise by a spring, not shown in the drawing. Elements 4 through 11 are gears for winding up; and 12 is a shaft fixedly combined with gear 4. Gear 7 and spool 13 are fitted loosely on shaft 12 and rotate therewith by the force of friction; 14 is a sprocket which forms a unit with the gears 8 and 9, and a shaft 15. When the windup lever 1 is rotated counterclockwise, the ratchet 3 pushes a pawl 16 installed on the gear 4, thereby rotating gears 4 through 11 in the directions of the arrows, respectively, the sprocket 14 advancing the film, and the spool 13 taking up the film. On the other hand, the gear 11 is fitted loosely on a shaft 21 on which pulleys 18 and 19 are fixedly attached for a first curtain 17 and a key cam 20. A key 22 is installed near the bottom of the shaft 21. The key 22 is given counterclockwise turning force by a spring 22b. The tip 22a of said key 22 engages a recess 20a of the cam 20 to form a clutch mechanism acting to give tension to the shutter; 23 is a frame counter scale plate; 24 is a ratchet for the frame counter; and 25 is a control cam which given an on-off signal to the clutch. Elements 23, 24, and 25 are combined into one unit and are fitted loosely on the shaft 2, and are given counterclockwise turning force by a spring 26; 28 is a pin installed off center on the shaft 15. A feed pawl 29 is fitted on the pin 28 and is pressed against the ratchet 24 by a spring 30; 31 is a stop pawl which is pressed against the ratchet 24 by a spring 32 similar to the above and which is used to advance the ratchet 24 by one tooth every time the sprocket 14 makes a turn; 33 is a return lever for the frame counter which is so installed as to be rotated counterclockwise around a shaft 35 by the action of a spring 34; 36 is a control lever which operates in conjunction with the control cam 25; and 37 is an intermediate cam. These are united by a shaft 38 into one rotable body inside the camera; and 39 is a release lever which is given force by a spring 40 to turn around a shaft 41. When depressing a pushbutton 42 while photographing, a slant face 43 of the bottom rotates the release lever 39 counterclockwise, which in turn pushes the pin 44 on the key lever 22 to release the shutter.

When the back cover of the camera (shown in part as 45) opens, the return lever 33 is rotated counterclockwise by the spring 34, to disengage the pawls 29 and by a pin 33b planted on the return lever 33. Thus, rotated pawl 29 hits and pushes the pawl 31, thereby freeing the ratchet 24. That is, pin 33b moves pawl 29 which, in turn, moves pawl 31, thereby freeing the ratchet 24 and, as a result, restoring the frame counter scale plate 23 to the start position. Simultaneously, the other end of the return lever 33 pushes one end 36a of the control lever 36 and rotates the release lever 39 counterclockwise by way of the intermediate lever 37.

When the film is loaded and the back cover 45 is closed, the return lever 33 is rotated clockwise and the release lever 39 tries to rotate clockwise in vain since the control lever 36 is limited in its motion by the projection 25a of the control cam 25. Film is advanced and the gear 11 is rotated in the direction of the arrow, as described previously, when the windup lever 1 is rotated. However, when the key 22 comes to the position where it is supposed to engage with the depression 20a of the cam 20 to tension the shutter, the pin 44 is pushed by the release lever 39 and the key 22 passes by that position without making engagement with the depression 20a. As a result, only the film is advanced and the shutter is not tensioned. During this period, the sprocket 14 rotates and the ratchet 24 is advanced to rotate counterclockwise by the pawl 29 and, when the control lever 36 is disengaged from the projection 25a, the release lever 39 is rotated clockwise until the intermediate lever 37 hits on the pin 49. In this state, the pin 44 is no longer pushed by the lever 39, and the tip 22a of the key 22 engages with the depression 20a of the cam 20 to tension the shutter, and the pin 46 on the cam 20 stop upon hitting the stop bar 47. Element 48 is a pawl that stops reversing motion. At this time the frame counter scale indicates the first frame, the unexposed portion of the film being at the film window, and the camera is ready for picture taking.

As described, according to this invention, a camera can rapidly be made ready for shooting a picture at the time of the film loading and without making any previous blank exposure.

Moreover, since the operation to prevent the shutter from being tensioned is made to interlock with the opening operation of the back cover, the restoration of the frame counter to the original position is not interrupted. The invented equipment is simple in construction which insures its operation.

Furthermore, the order in which first the exposed portion of the film is advanced and then the shutter is tensioned to make the camera ready for shooting gives a natural feeling psychologically.

What is claimed is:

1. A film windup device for cameras having a back cover provided with shutter means, shutter tensioning means connected with film-advancing mechanism comprising, in combination, a frame counter having a scale plate which is advanced by one scale mark in connection with one frame film advance and returns to its initial position when the back cover of the camera is opened,
   clutch means for connecting or disconnecting the shutter tensioning means to or from the shutter means,
   control means engageable with said clutch means to disconnect the shutter tensioning means from the shutter means
   a cam combined with said scale plate and
   a return lever biased by means of spring to drive said control means which engages with said clutch means to disconnect the shutter tensioning means from the shutter means when said back cover is opened, whereby said cam holds said control means in engaged position during the predetermined angle rotation of said cam after the closure of the back cover.

2. A film windup device as claimed in claim 1 wherein said frame counter includes a ratchet wheel combined with said scale plate and said cam, a stop pawl arranged to cooperate with said ratchet wheel to prevent the return movement of said scale plate, a feed pawl arranged to cooperate with said ratchet wheel to advance said scale plate by one scale mark in connection with film advance, and said return lever drives said pawls to disengage from said ratchet wheel and releases the return movement of said scale plate when said back cover is opened.

3. A film windup device as claimed in claim 1 further comprising a shutter release means, wherein said control means includes a lever spring-biased to disengage from the clutch means, said shutter release means arranged to drive said lever to engage said clutch means and disconnect the shutter tensioning means from the shutter.

4. A film windup device for cameras having a back cover comprising film-advancing means, shutter means, clutch means for normally connecting said film-advancing means to said shutter means in operative engagement, film counter means, means for returning said film counter means to its initial position upon opening said back cover, means for disengaging said clutch means upon opening said back cover, and means for retaining said clutch means in its disengaged position for a predetermined film advance subsequent to closure of said back cover.

5. A film windup device for cameras according to claim 4 wherein said frame counter means includes a scale plate, a ratchet wheel mounted coaxially with said scale plate, a stop pawl mounted adjacent said ratchet wheel to prevent return movement of said scale plate, a feed pawl mounted adjacent said ratchet wheel to advance said scale plate by one scale mark corresponding to a film advance; and wherein said means for returning said film counter means to its initial position upon opening said back cover comprises a return lever mounted for rotary movement upon opening said back cover to disengage said feed pawl and said stop pawl from said ratchet wheel, and a spring member to urge said scale plate to its initial position.

6. A film windup device for cameras according to claim 4 wherein said means for disengaging said clutch means upon opening said back cover comprises a return lever mounted for rotary movement upon opening said back cover, a control lever mounted for movement responsive to movement of said return lever, a release lever mounted for movement responsive to movement of said control lever to disengage said clutch means.

7. A film windup device for cameras according to claim 6 wherein said frame counter means includes a scale plate, a ratchet wheel mounted coaxially with said scale plate, a stop pawl mounted adjacent said ratchet wheel to prevent return movement of said scale plate, a feed pawl mounted adjacent said ratchet wheel to advance said scale plate by one scale mark corresponding to a film advance, and wherein said means for returning said film counter means to its initial position upon opening said back cover includes said return lever mounted for rotary movement upon opening said back cover to disengage said feed pawl and said stop pawl from said ratchet wheel, and a spring member to urge said scale plate to its initial position, and wherein said means for retaining said clutch means in its disengaged position for a predetermined film advance subsequent to closure of said back cover includes a control cam mounted for movement with said scale plate, a projection on said control cam for engaging said control lever to retain said control lever in position to be responsive to movement of said return lever, and means for moving said control cam to disengage said projection from said control lever to move said control lever to its nonresponsive position with respect to said return lever after a predetermined film advance, thereby releasing said release lever and allowing said clutch means to connect said film-advancing means to said shutter means in operative engagement.

* * * * *